(12) United States Patent
Jin et al.

(10) Patent No.: US 10,671,666 B2
(45) Date of Patent: *Jun. 2, 2020

(54) PATTERN BASED AUDIO SEARCHING METHOD AND SYSTEM

(71) Applicant: International Business Machines Corporation, Armonk, NY (US)

(72) Inventors: Feng Jin, Beijing (CN); Qin Jin, Beijing (CN); Wen Liu, Beijing (CN); Yong Qin, Beijing (CN); Xu Dong Tu, Beijing (CN); Shi Lei Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1021 days.

This patent is subject to a terminal disclaimer.

(21) Appl. No.: 15/185,316

(22) Filed: Jun. 17, 2016

(65) Prior Publication Data

US 2016/0292267 A1 Oct. 6, 2016

Related U.S. Application Data

(63) Continuation of application No. 14/105,874, filed on Dec. 13, 2013, now Pat. No. 9,396,256.

(51) Int. Cl.
*G06F 16/683* (2019.01)
*G06N 20/00* (2019.01)
*G06F 16/68* (2019.01)

(52) U.S. Cl.
CPC .......... *G06F 16/683* (2019.01); *G06F 16/686* (2019.01); *G06N 20/00* (2019.01)

(58) Field of Classification Search
CPC ... G06F 16/686; G06F 16/683–16/685; G06N 20/00–20/20;

(Continued)

(56) References Cited

U.S. PATENT DOCUMENTS 6,710,822 B1 * 3/2004 Walker ............... G06K 9/00718
348/722
2003/0018475 A1 1/2003 Basu et al.
(Continued)

FOREIGN PATENT DOCUMENTS

| CN | 101364222 A | 2/2009 |
|---|---|---|
| CN | 101477798 A | 7/2009 |
| CN | 102033927 A | 4/2011 |
| TW | 1220483 B | 8/2004 |
| WO | 2008126262 A1 | 10/2008 |

OTHER PUBLICATIONS

Dzeroski, Saso et al.; Analysis of Time Series Data with Predictive Clustering Trees; 2007 Springer-Verlag Berlin Heidelberg; KDID 2006, LNCS 4747, pp. 63-80. (Year: 2007).*

(Continued)

*Primary Examiner* — Stanley K. Hill
(74) *Attorney, Agent, or Firm* — Cantor Colburn LLP; Joseph Petrokaitis

(57) ABSTRACT

A pattern based audio searching method includes labeling a plurality of source audio data based on patterns to obtain audio label sequences of the source audio data; obtaining, with a processing device, an audio label sequence of target audio data; determining matching degree between the target audio data and the source audio data according to a predetermined matching rule based on the audio label sequence of the target audio data and the audio label sequences of the source audio data; and outputting source audio data having matching degree higher than a predetermined matching threshold as a search result.

18 Claims, 6 Drawing Sheets

(58) Field of Classification Search
CPC .............................. G10L 15/08–15/197; G10L 2015/0631–2015/0633; G10L 15/04
See application file for complete search history.

(56) References Cited

U.S. PATENT DOCUMENTS

| | | | |
|---|---|---|---|
| 2003/0187642 A1 | 10/2003 | Ponceleon et al. | |
| 2010/0121637 A1* | 5/2010 | Roy | G10L 15/22 704/235 |
| 2012/0185418 A1 | 7/2012 | Capman et al. | |
| 2013/0282379 A1 | 10/2013 | Stephenson et al. | |
| 2014/0199964 A1* | 7/2014 | Ma | H04W 4/021 455/410 |

OTHER PUBLICATIONS

Rani, Sangeeta et al.; Recent Techniques of Clustering of Time Series Data: A Survey; International Journal of Computer Applications (0975-8887) vol. 52—No. 15, 2012, pp. 1-9. (Year: 2012).*

Chinese Application No. 2012105055622, Filed: Nov. 30, 2012, "Pattern Based Audio Searching Method and System", Inventors: Feng Jin, et al., pp. 1-30.

F. Beaufays, et al., "Unsupervised Discovery and Training of Maximally Dissimilar Cluster Models," Proc. Interspeech, 2010, pp. 1-4.

Lei Lu, "Content Discovery From Composite Audio: An unsupervised Approach," Thesis—Delft Univeristy of Technology, Delft Mediamatica, 2009, pp. 1-155.

Rui Cai, et al., "Unsupervised Content Discovery in Composite Audio," Multimedia '05 Proceedings of the 13th annual ACM international conference on Multimedia, pp. 628-637, Nov. 6-11, 2005.

List of IBM Patents or Patent Applications Treated as Related; (Appendix P), Date Filed Jun. 17, 2016 2 page.

U.S. Appl. No. 14/105,874, filed Dec. 13, 2013; Entitled: Pattern Based Audio Searching Method and System.

Author Unknown "Research of Audio Retrieval Technology Based on Feature Similarity", with English Abstract; dated Dec. 15, 2011; 48 pgs.

Chinese Office Action for Application No. 201210505562.2 dated Jul. 19, 2016; 6 pgs.

* cited by examiner

PATTERN BASED AUDIO SEARCHING METHOD AND SYSTEM

DOMESTIC PRIORITY

This application is a Continuation of the legally related U.S. application Ser. No. 14/105,874, filed Dec. 13, 2013, the contents of which are incorporated by reference herein in their entirety.

BACKGROUND

The present invention relates to a field of multimedia information retrieval, and more specifically, to a pattern based audio searching method and system.

The widespread popularity of the Internet has promoted the rapid development of multimedia information techniques. The amount of multimedia data available on the Internet has gained a sharp increase. For example, audio/video files uploaded every minute on YouTube are as long as 48 hours. The massive amount of data makes it impossible to preview them in sequence, and thus data indexing and retrieving have become more challenging tasks.

How to accurately find out data files of a desired subject matter from a data corpus is a study hotspot in the field of multimedia information retrieval. For example, a wedding company may want to find mass materials according to fewer wedding samples to compose a final wedding file. A radio producer or a team from a video website may desire to search interested types of programs from a mass amount of data based on limited materials to assist in rapid programming. Moreover, users may want to perform automatic label-based achieving on their own multimedia databases for more efficient management.

Compared to video based retrieving, audio based retrieving has wider applications, for example, in situations where only audio data can be provided, such as, for example, radio broadcasting. Audio data contains significant information that can help to understand content, and is generally smaller than a video file. Therefore, in the case of having to compress a video file to a slightly obscure extent due to, for example, network upload capacity restrictions, audio content can still keep clear anyway.

However, audio indexing and retrieving methods have many defects in the prior art. At first, existing audio indexing and retrieval methods need a large amount of manual labels. For example, an audio website in general has a large amount of unlabeled or roughly labeled files, which lack well defined descriptions and effective recommended related links. Operators have to manually label some well-known programs or files having higher access amounts and recommend related links. Thus, such audio indexing and retrieving methods can only be used in special fields and limited datasets.

Secondly, existing audio indexing and retrieving methods only model based on audio labels per se, resulting in inaccurate indexing and retrieving results. For example, the sound of water splashing has distinct meanings in the context of a natural stream and in the context of a home kitchen. Also, the sound of clapping is distinct in entertainment, talk show or sports programs. If a user inputs a stream splashing sound as a sample and desires to find out more similar materials from a multimedia database, the existing audio retrieving methods cannot distinguish data files containing the sound of water splashing in a natural stream pattern from that in a home kitchen pattern. Obviously, many audio retrieving results are inaccurate when not taking their context information into account.

Thirdly, existing audio retrieving methods commonly employ a single round sequential retrieval strategy where audio data is first segmented and then each segment is classified. Thereby, errors in a previous step may affect the execution result of its subsequent steps, and are accumulated in the final retrieval result, resulting in an inaccurate retrieval result or a result completely deviated from the retrieving target.

SUMMARY

In one embodiment, a pattern based audio searching method includes labeling a plurality of source audio data based on patterns to obtain audio label sequences of the source audio data; obtaining, with a processing device, an audio label sequence of target audio data; determining matching degree between the target audio data and the source audio data according to a predetermined matching rule based on the audio label sequence of the target audio data and the audio label sequences of the source audio data; and outputting source audio data having matching degree higher than a predetermined matching threshold as a search result.

In another embodiment, a pattern based audio searching system includes a labeling unit, configured to label a plurality of source audio data based on patterns to obtain audio label sequences of the source audio data; a target obtaining unit, configured to obtain an audio label sequence of target audio data; a matching degree determination unit configured to determine matching degree between the target audio data and the source audio data according to a predetermined matching rule based on the audio label sequence of the target audio data obtained by the target obtaining unit and the audio label sequences of the source audio data obtained by the labeling unit; and a search output unit, configured to output source audio data having matching degree determined by the matching degree determination unit higher than a predetermined matching threshold as a search result.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
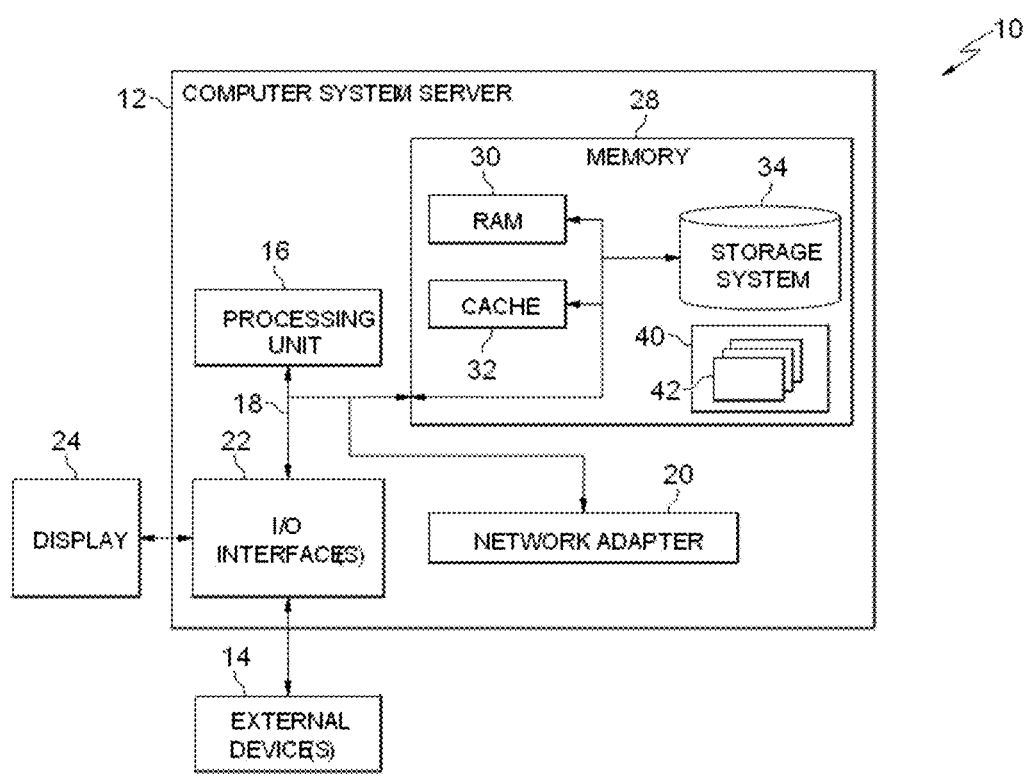
FIG. 1 shows an exemplary computer system which is applicable to implement the embodiments of the present invention.

In view of the above, an automatic audio searching method and system without manual labeling is desired.

Further, it is desired to provide an audio searching method and system, which is based on context patterns and can take audio class similarity into account.

Further, it is desired to provide an audio searching method and system, which can automatically eliminate accumulated errors and provide a more accurate retrieval result.

Accordingly, embodiments of the invention automatically perform pattern-based labeling and modeling on source audio data while taking audio class similarity into account to provide accurate audio retrieval results.

To this end, the audio searching method and system performs automatic audio labeling on source audio data by iterative segmentation and clustering processes, build a context pattern based decision tree and train a segment labeling model for leaf nodes on the decision tree in each iteration, and then provide an audio retrieval result based on pattern comparison and in conjunction with audio class similarity.

In a first aspect, there is provided a pattern based audio searching method, comprising: labeling a plurality of source audio data based on patterns to obtain audio label sequences of the source audio data; obtaining an audio label sequence of target audio data; determining matching degree between the target audio data and the source audio data according to a predetermined matching rule based on the audio label sequence of the target audio data and the audio label sequences of the source audio data; and outputting source audio data having matching degree higher than a predetermined matching threshold as a search result.

In an embodiment, labeling a plurality of source audio data based on patterns comprises: (a) dividing each of the plurality of source audio data to obtain a plurality of segments; (b) determining an audio class sequence for each of the plurality of source audio data using a clustering algorithm, based on the obtained plurality of segments; (c) building a decision tree based on patterns according to the audio class sequences determined for a plurality of the source audio data; (d) training a segment labeling model for each of leaf nodes on the decision tree; (e) obtaining an audio label sequence for and adjusting segmentation of each of the plurality of source audio data, using the trained segment labeling model; and (f) repeating the operations (b) to (e) when a predetermined iteration condition is met.

In a second aspect, there is provided a pattern based audio searching system, comprising: a labeling unit, configured to label a plurality of source audio data based on patterns to obtain audio label sequences of the source audio data; a target obtaining unit, configured to obtain an audio label sequence of target audio data; a matching degree determination unit configured to determine matching degree between the target audio data and the source audio data according to a predetermined matching rule based on the audio label sequence of the target audio data obtained by the target obtaining unit and the audio label sequences of the source audio data obtained by the labeling unit; and a search output unit, configured to output source audio data having matching degree determined by the matching degree determination unit higher than a predetermined matching threshold as a search result.

In an embodiment, the labeling unit comprises: a dividing unit, configured to divide each of the plurality of source audio data to obtain a plurality of segments; a clustering unit, configured to determine an audio class sequence for each of the plurality of source audio data using a clustering algorithm, based on the obtained plurality of segments; a decision tree building unit, configured to build a decision tree based on patterns according to the audio class sequences determined for a plurality of the source audio data by the clustering unit; a model training unit, configured to train a segment labeling model for each of leaf nodes on the decision tree built by the decision tree building unit; a segment adjustment unit, configured to obtain an audio label sequence for and adjusting segmentation of each of the plurality of source audio data, using the trained segment labeling model trained by the model training unit; and an iteration condition determination unit, configured to determine whether a predetermined iteration condition is met.

With the method and system disclosed herein, audio searching can be performed automatically without manual labeling. In addition, audio class labeling can be performed based on context patterns in an iterative manner, to provide a more accurate and reasonable audio search result. Audio searching can further be performed based on context patterns and taking audio class similarity into account.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As described above, the audio searching method and system of this invention performs automatic audio labeling on source audio data by iterative segmentation and clustering processes, build a context pattern based decision tree and train a segment labeling model for leaf nodes on the decision tree in each iteration, and then provide an audio retrieval result based on pattern comparison and in conjunction with audio class similarity.

Figure 2:
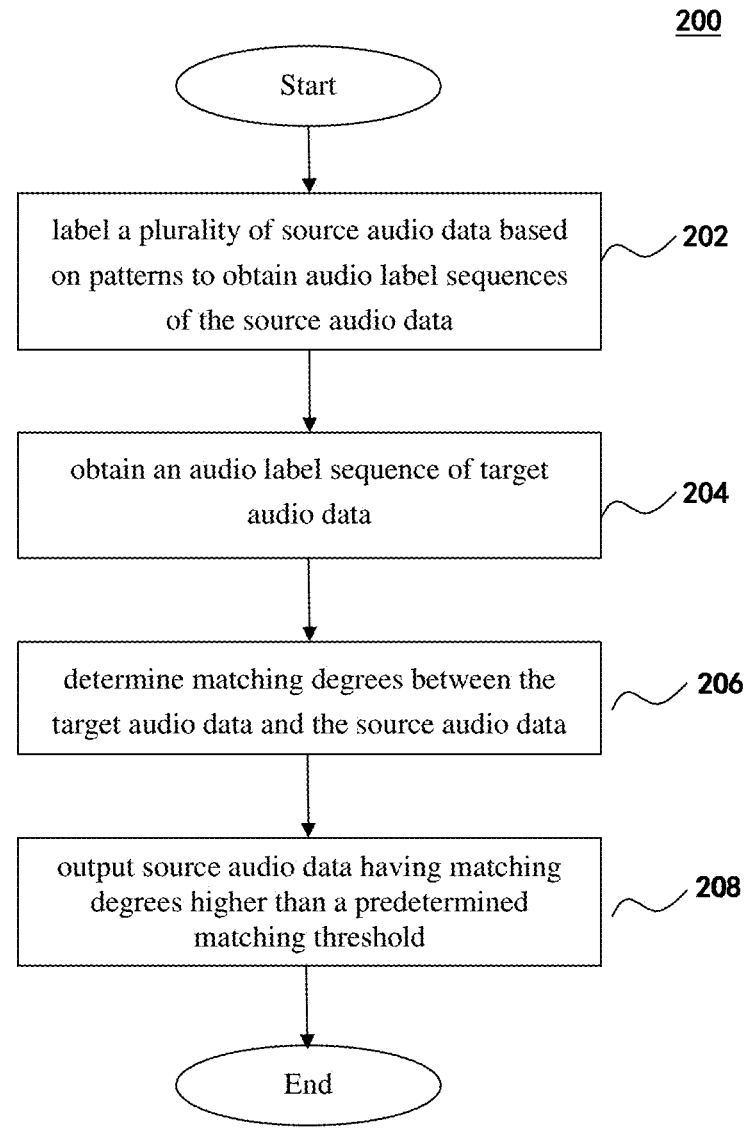
FIG. 2 is a general flowchart of a pattern based audio searching method according to an embodiment of this invention.

Embodiments of this invention will be described in detail with reference to FIG. 2 to FIG. 9. FIG. 2 is a general flowchart of a pattern based audio searching method 200 according to an embodiment of this invention. First, pattern based audio class labeling is performed on a plurality of audio data, for example, contained in an audio database, to obtain audio label sequences of the source audio data (block 202).

Note that the term "audio class" as used herein refers to an audio type. Ideally, an "audio class" may be an event type involved in an audio segment, such as gunshot, water splashing, cheer, scream or the like. However, in general, an "audio class" does not necessarily correspond to an event type involved in the audio segment, and it can be merely a calculation result based on a specific audio process algorithm (for example, a clustering algorithm), and thus does not have a semantic meaning. This invention can perform accurate audio labeling and retrieving without recognizing the particular event type represented by each audio class, and thus the audio labeling and searching method of this invention are unsupervised and are executed automatically.

Figure 3:
FIG. 3 schematically shows an example of an audio class sequence.

Audio data is formed by a plurality of continuous or discontinuous audio segments, so that the term "audio class sequence" as used herein refers to a series of audio classes with time, recording audio classes present in sequence in the audio data and their corresponding durations. FIG. 3 shows an example of an audio class sequence in an ideal situation. The term "context pattern" or "pattern" as used herein refers to the context involved in the audio data, for example, a natural stream, a home kitchen, a bus stop, an entertainment, a talk show, or a sports program.

Figure 4:
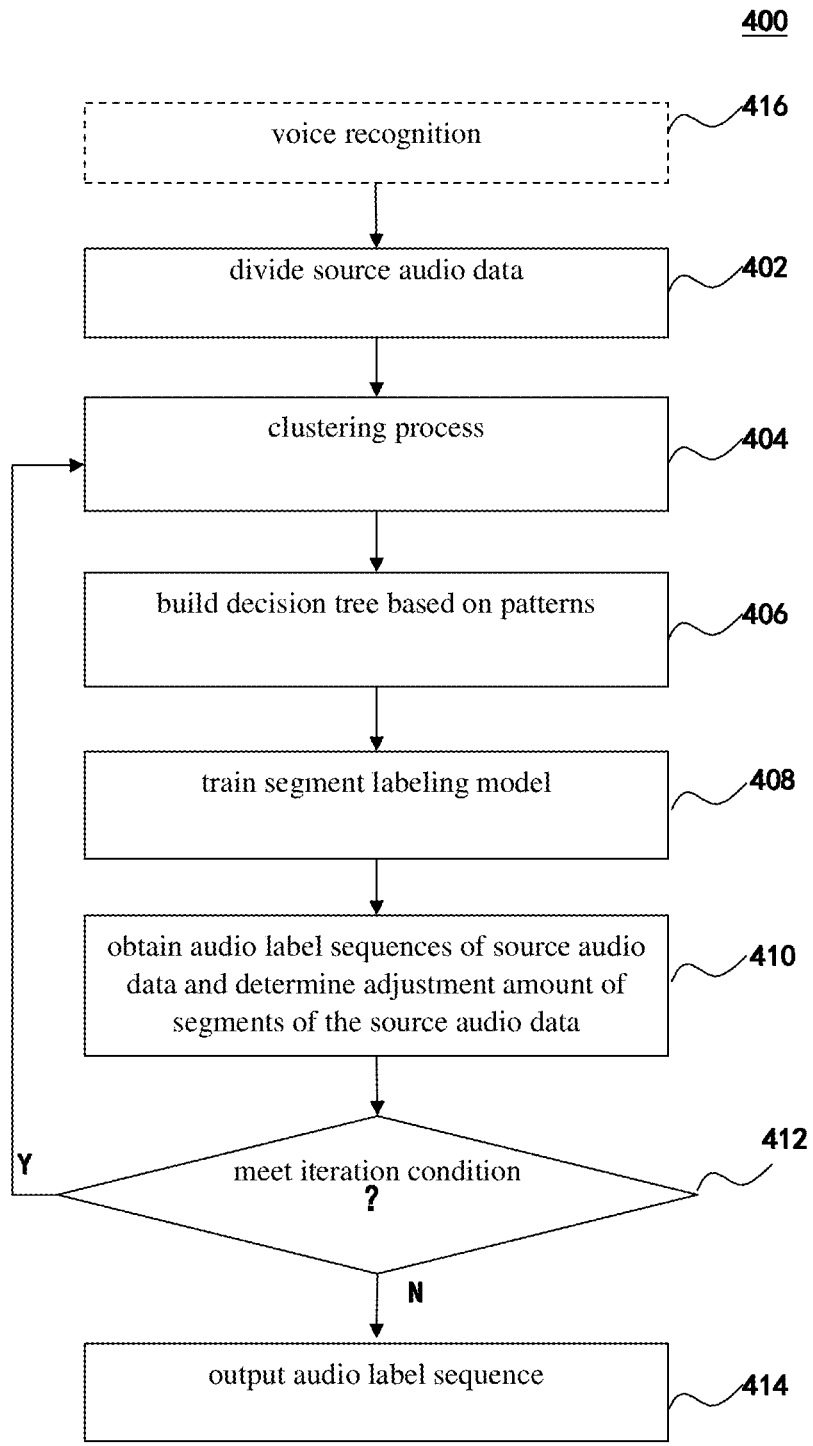
FIG. 4 is a flowchart illustrating a pattern based audio class labeling process performed on source audio data according to an embodiment of this invention.

FIG. 4 shows in detail a process 400 of a specific implementation of block 202, in which automatic audio labeling is performed on source audio data by iterative segmentation and clustering processes, and in each iteration, a decision tree is built based on context patterns and segment labeling models are trained for leaf nodes on the decision tree.

The process 400 may begin at block 402, where each of the plurality of audio data is divided to obtain a plurality of segments. In an embodiment, the source audio data can be divided by silence detection. In another embodiment, the source audio data can be divided by an audio window having a predetermined length. In yet another embodiment, the audio data can be divided by even flat start. In still another embodiment, the audio data can be divided in a manner of any combination of silence division, window division, and even time division.

Note that the source audio data segmentation result at block 402 may be relatively rough. Through a subsequent iterative clustering process, a decision tree building process and a model training process, more and more accurate segmentation results can be obtained by use of a Viterbi algorithm.

Then, at block 404, based on the plurality of segments obtained by the segmentation at block 402, an audio class sequence is determined for each source audio data using a clustering algorithm. In an example, a Gaussian Mixture Model (GMM) is built using audio features extracted from the obtained plurality of segments. Once the model is determined, distances between audio classes can be determined. Then, based on the built GMM, hierarchical clustering is performed to finally determine the audio class sequence of the source audio data using a clustering algorithm according to specific audio features (for example, time domain or frequency domain audio features) and the audio class distances.

According to the clustering algorithm and predetermined clustering criteria, the clustering process can terminate at an expected clustering level. In this example, a variable at the terminating level of the clustering process is defined as an "audio class", and variables at lower levels thereof are defined as "audio sub-classes". Correspondingly, a series of audio classes arranged in a time sequential order may form an "audio class sequence". As described above, it should be understood that the audio classes and audio sub-classes obtained at block 404 may have no semantic meanings.

Figure 5:
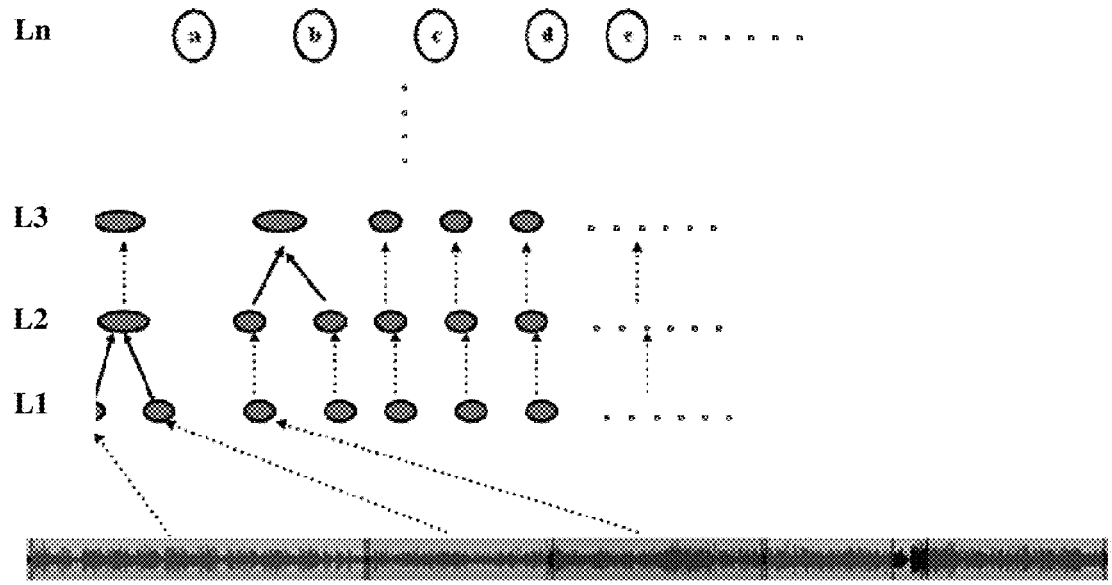
FIG. 5 schematically shows an example of a clustering process.

FIG. 5 shows an example of the clustering process where points at L1 represent the variables of a GMM model built according to audio features extracted from a plurality of audio segments, L2, L3, . . . Ln represent audio clustering levels obtained using a clustering algorithm based on specific time domain or frequency domain audio features and audio class distances, wherein the points at Ln (for example, a, b, c, d, e) are defined as audio classes, while the points at L2 to Ln−1 can be considered as audio sub-classes of the audio data.

Figure 6:
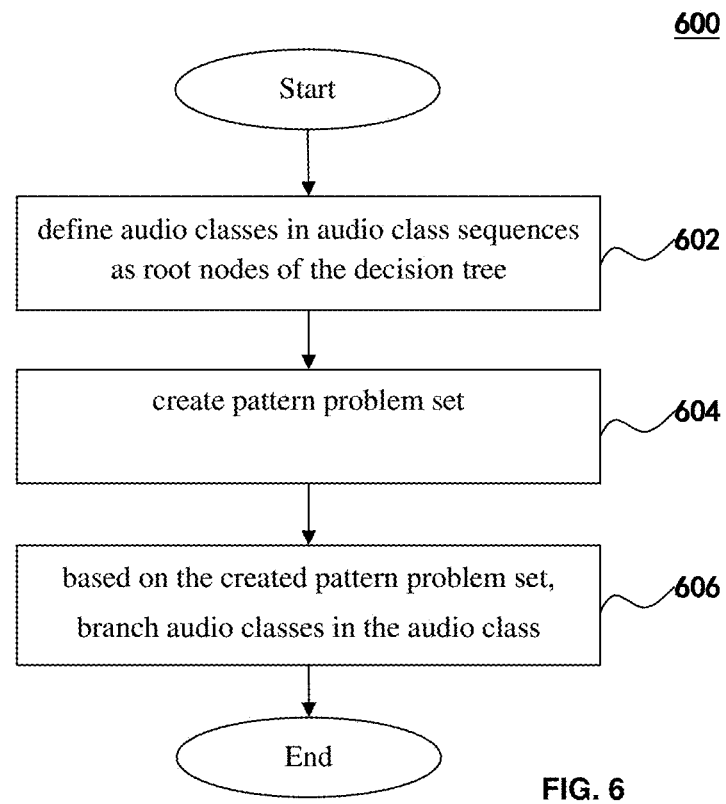
FIG. 6 is a flowchart illustrating a process for building a decision tree based on patterns according to an embodiment of this invention.

Next, at block 406, according to the plurality of audio class sequences determined for the plurality of source audio data at block 404, a decision tree is built based on patterns. FIG. 6 shows a process 600 of a specific implementation of block 406 for building a decision tree based on patterns. First, at step 602, audio classes of the audio class sequences determined at block 404 (for example, a, b, c, d, e . . . at Ln level of FIG. 5) are defined as root nodes of the decision tree.

Next, at block 604, a pattern problem set is created based on the context of each of the audio classes that are defined as the root nodes in the audio class sequences. The pattern problem set can be built according to a predetermined rule, for example, maximizing the divergences between the obtained branches. In an example, the context of an audio class may refer to a preceding audio class and a succeeding audio class in the audio class sequence. In another example, the context of an audio class refers to one or more audio sub-classes obtained with respect to the audio class in the clustering process at block 404 of FIG. 4. The context of an audio class may reflect a context pattern of the audio class to some extent. For example, for an audio class related to train whistles, if a preceding audio class of the audio class in a sequence is related to loudspeaker speaking, and its succeeding audio class in the sequence is related to varied sounds of voices, then it is perhaps a context pattern of a train station. However, if its preceding audio class is related to gunshot and its succeeding audio class is related to cheering, it is likely a context pattern of a movie scene, such as "Railway Guerrillas".

At block 606, with the created pattern problem set, leaf nodes of the decision tree which branch out from the audio classes of the audio class sequences are determined. The term "leaf nodes of the decision tree" as used herein refers to nodes which do not have any lower sub-nodes in the decision tree. That is, any node that has lower sub-nodes is defined as a "root node". Note that the decision tree can be branched down to a predetermined node level. For example, the building of the decision tree may terminate when the number of audio labels contained in each leaf node is less than a predetermined threshold.

Figure 7:
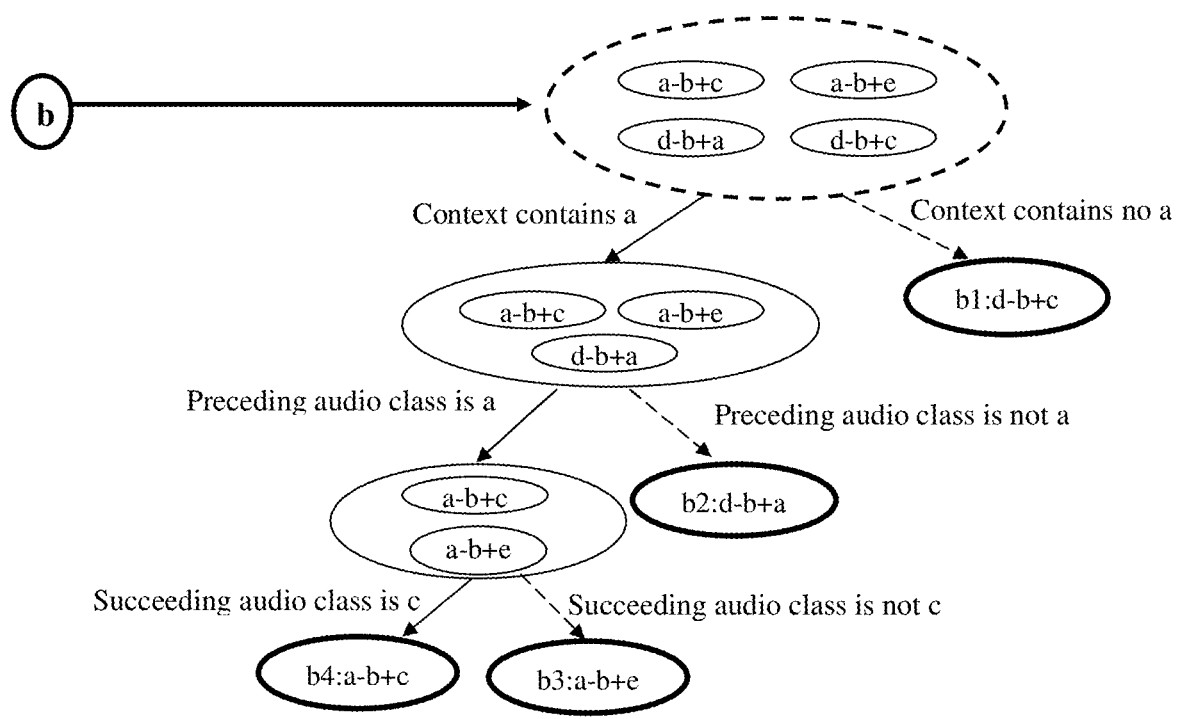
FIG. 7 schematically shows an example of a decision tree building process.

FIG. 7 shows an example of a decision tree building process where audio class b is an audio class in an audio class sequence obtained through the clustering process in the example of FIG. 5. Assume that among the audio class sequences that are obtained by performing a clustering process on the plurality of source audio data, four sequences contain audio class b, i.e. (a−b+c), (a−b+e), (d−b+a) and (d−b+c), as shown in FIG. 7, wherein the symbol "−" represents a preceding audio class of audio class b, and the symbol "+" represents a succeeding audio class of audio class b in a sequence. That is, (a−b+c) represents the preceding audio class of audio class b in the sequence is audio class a and the succeeding audio class is c.

With the context based problem set, audio class b can be branched down to leaf nodes, for example b1, b2, b3, b4. For example, audio class b can be first branched with a problem "whether context contains audio class a", as a result, (d−b+c) is branched out and is defined as leaf node b1. Next, a problem "whether preceding audio class is a" is considered for further branching, and thus (d−b+a) is branched out and is defined as leaf node b2. Then, a problem "whether succeeding audio class is c" is considered to further branch, and thus distinguish (a−b+e) from (a−b+c), which are respectively defined as leaf nodes b3 and b4. By now, the building of the decision tree is complete.

Returning to FIG. 4, at block 408, for each leaf node on the decision tree, a segment labeling model is trained. In an example, the segment labeling model may comprise a Hidden Markov Model (HMM) and a duration model. With the trained segment labeling model, an audio label sequence of each source audio data is obtained and the segmentation of the source audio data is adjusted (block 410). Note that the "audio label sequence" as used herein is related to, but differs from the audio class sequence in that it does not correspond to an event type involved in the audio content, and is merely a calculation result of some audio process algorithm (for example, Viterbi algorithm) for the convenience of a subsequent matching process. In an embodiment of this invention, step 410 can be realized through the following operations: first, audio class distances of the source audio data are determined using the segment labeling models trained at step 408; then, based on the trained segment labeling models, Viterbi decoding is performed using audio features extracted from the source audio data and the determined audio class distances; at last, according to the Viterbi decoding result, an audio label sequence of the source audio data is obtained, and the segmentation of the source audio data is adjusted.

Next, the process 400 proceeds to a determination block 412 to determine whether a predetermined iteration condition is met. In an example, the predetermined iteration condition may comprise: an adjustment amount of the source audio data segmentation is not less than a predetermined segmentation difference; and/or a number of iteration is less than a predetermined iteration number threshold.

In the case of determining that the predetermined iteration condition is met at block 412, the method 400 turns to block 404 to perform the clustering process, the decision tree building process and the segment labeling model training process based on the segments adjusted at step 410. If the iteration can exit as determined at step 412, the obtained audio label sequence of the audio data is outputted at step 414.

In an embodiment of this invention, before the audio data segmentation at block 402, it may further comprise determining whether the source audio data is voice data (block 416). Source audio data contained in an audio database may be voice data or non-voice data. The Supported Vector Machine (SVM) method that is well known in the art can be used to distinguish between voice and non-voice. The accurate distinguishing voice from non-voice is helpful for the subsequent segmentation, clustering, decision tree building and model training steps.

Returning now to the method 200 of FIG. 2, after obtaining the audio label sequences of the source audio data at block 202, the method proceeds to block 204. At block 204, the audio label sequence of target audio data is obtained. In an embodiment of this invention, the audio label sequence of the target audio data is obtained by performing Viterbi decoding on the target audio data based on, for example, the segment labeling models trained at block 408 of FIG. 4.

Next, at block 206, based on the audio label sequence of the target audio data obtained at block 204 and the audio label sequences of the source audio data obtained at block 202, the matching degrees between the target audio data and the source audio data are determined based on a predetermined matching rule.

Figure 8:
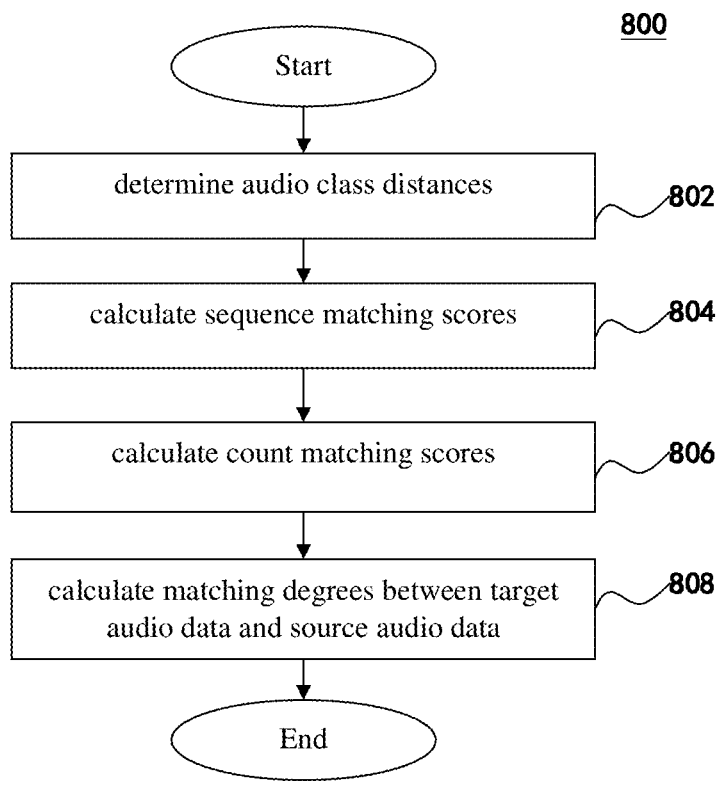
FIG. 8 is a flowchart illustrating a process for determining matching degree between target audio data and source audio data according to an embodiment of this invention.

FIG. 8 shows a process 800 of a specific implementation at block 206 for determining the matching degrees between the target audio data and the source audio data, where source audio data related to the target audio data is retrieved and sorted by a comprehensive consideration about similarities between audio classes and matching degrees between context patterns.

First, at block 802, audio class distances between audio classes associated with the target audio data and the source audio data are determined. For example, the audio class distances can be determined based on the segment labeling models trained at block 408 of FIG. 4. Next, at block 804, by comparing the audio label sequence of the target audio data and the audio label sequences of the source audio data, sequence matching scores are calculated based on the audio class distances obtained at block 802. In an example, similarities, i.e., sequence matching scores, between the audio label sequence of the target audio data and the audio label sequences of the source audio data can be calculated using Dynamic Time Warping (DTW) algorithm with the audio class distances as weights.

Next, at block 806, by counting the numbers of audio classes in the audio class sequences of the target audio data and the source audio data, count matching scores are calculated. For example, the appearance number of each audio class in a particular time period can be counted. The count matching score calculation is helpful to recognize similar context patterns. At block 808, the sequence matching scores calculated at block 804 and the count matching scores calculated at block 806 are combined by use of their respective weight values to determine the matching degrees between the target audio data and the source audio data.

Note that the weight values of the sequence matching scores and the count matching scores can be determined as required or empirically. In an example, it is possible to only consider one of the sequence matching score and the count matching score. For example, the matching degree between the target audio data and a source audio data can be determined only based on the sequence matching score.

Returning to FIG. 2, after determining the matching degree between the target audio data and the source audio data at block 206, the method proceeds to block 208 in which source audio data having matching degrees higher than a predetermined matching degree threshold are outputted as search result. The method 200 then ends. In some embodiments, after determining the search result, the source audio data can be further added to the audio database to, for example, further train the segment labeling models at block 408 in FIG. 4.

Figure 9:
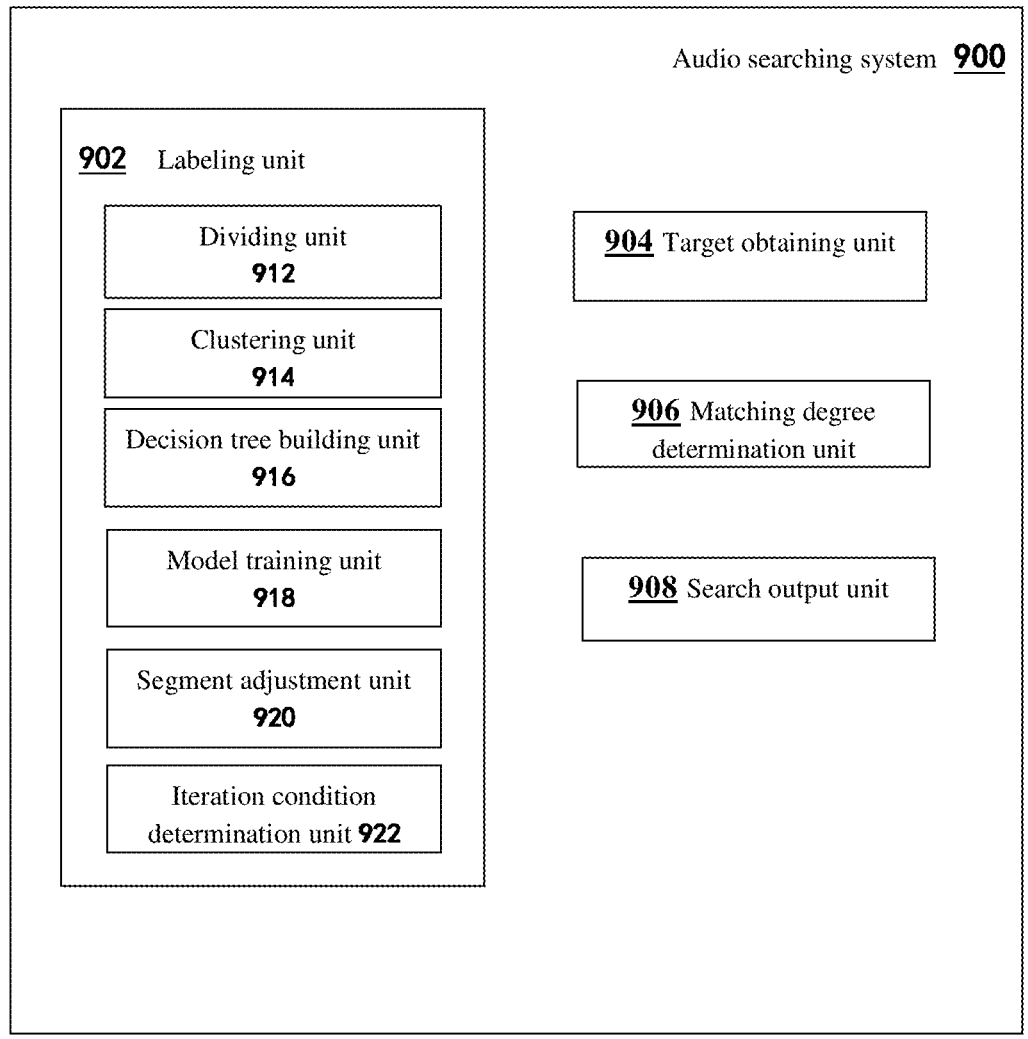
FIG. 9 shows a function block diagram of a pattern based audio searching system according to an embodiment of this invention.

FIG. 9 shows a functional block diagram of a pattern based audio searching system 900 according to an embodiment of this invention. The function modules of the audio searching system 900 can be can be implemented in hardware, software, or a combination of hardware and software realizing the principle of this invention. Those skilled in the art may understand function modules shown in FIG. 9 may be combined or subdivided into sub-modules to realize the principle of this invention. Thus, the description herein may support any possible combination, sub-dividing, or further definition of function modules described herein.

The audio searching system 900 can iteratively perform automatic audio class labeling and searching based on context patterns without manual labeling, so that a more accurate and reasonable audio searching result can be provided. The audio searching system 900 may comprise a labeling unit 902, a target obtaining unit 904, a matching degree determination unit 906, and a search output unit 908.

Labeling unit 902 is configured to label a plurality of source audio data, for example contained in an audio database, based on patterns to obtain audio label sequences of the source audio data. In an embodiment, the labeling unit 902 may comprise a dividing unit 912, a clustering unit 914, a decision tree building unit 916, a model training unit 918, a segment adjustment unit 920, and an iteration condition determination unit 922. Dividing unit 912 is configured to divide each of the plurality of source audio data to obtain a plurality of segments. In an example, dividing unit 912 may divide the source audio data according to a combination of any one or more of dividing the source audio data by silence detection, dividing the source audio data by an audio window with a predetermined length, and dividing the source audio data by even flat start. In an embodiment, dividing unit 912 comprises a voice recognition unit configured to determine whether the source audio data is voice data, and a dividing execution unit configured to divide, based on the determination by the voice recognition unit, the source audio data to obtain the plurality of segments.

Clustering unit 914 is configured to determine an audio class sequence for each of the plurality of source audio data using a clustering algorithm, based on the obtained plurality of segments. In an example, clustering unit 914 comprises: a first clustering sub-unit configured to build a GMM using audio features extracted from the obtained plurality of segments; and a second clustering sub-unit configured to, based on the GMM built by the first clustering sub-unit, determine an audio class sequence for the source audio data using a clustering algorithm according to specific audio features and audio class distances.

Decision tree building unit 916 is configured to build a decision tree based on patterns according to the audio class sequences determined for a plurality of the source audio data by clustering unit 914. In an example, decision tree building unit 916 comprises: a first decision tree building sub-unit configured to define audio classes in the audio class sequences determined by clustering unit 914 as root nodes on the decision tree; a second decision tree building sub-unit configured to create a pattern problem set based on context of each of the audio classes defined by the first decision tree building sub-unit as the root nodes in the audio class sequences; and a third decision tree building sub-unit configured to, based on the created pattern problem set, determine leaf nodes of the decision tree which branch out from the audio classes in the determined audio class sequences.

Model training unit 918 is configured to train a segment labeling model for each of leaf nodes on the decision tree built by decision tree building unit 916. In an example, the segment labeling model is for example a HMM and a duration model.

Segment adjustment unit 920 can be configured to obtain an audio label sequence for and adjusting segmentation of each of the plurality of source audio data, using the trained segment labeling model trained by model training unit 918. In an example, segment adjustment unit 920 comprises: a first segment adjustment sub-unit configured to determine audio class distances of the source audio data using the segment labeling model trained by model training unit 918; a second segment adjustment sub-unit configured to perform Viterbi decoding using audio features extracted from the source audio data and the audio class distances determined by the first segment adjustment sub-unit, based on the trained segment labeling model; and a third segment adjustment sub-unit configured to obtain the audio label sequence of the source audio data and adjust the segmentation of the source audio data, according to the Viterbi decoding result obtained by the second segment adjustment sub-unit.

Iteration condition determination unit 922 is configured to determine whether a predetermined iteration condition is met. In an example, the predetermined iteration condition may comprise that an adjustment amount of source audio data segmentation is not less than a predetermined segmentation difference, and/or an iteration number is less than a predetermined iteration number threshold.

Target obtaining unit 904 is configured to obtain an audio label sequence of target audio data. In an embodiment, target obtaining unit 904 comprise a unit configured to perform Viterbi decoding on the target audio data to obtain the audio label sequence of the target audio data, based on the segment labeling model trained by model training unit 918.

Matching degree determination unit 906 is configured to determine matching degrees between the target audio data and the source audio data according to a predetermined matching rule based on the audio label sequence of the target audio data obtained by target obtaining unit 904 and the audio label sequences of the source audio data in the audio database obtained by labeling unit 902.

In an embodiment, matching degree determination unit 906 comprises: an audio class similarity determination unit, configured to determine audio class distances between audio classes associated with the target audio data and the source audio data; a sequence comparing unit, configured to calculate a sequence matching score by comparing the audio label sequence of the target audio data to the audio label sequence of the source audio data based on the audio class distances determined by the audio class similarity determination unit; a count comparing unit, configured to calculate a count matching score by counting the audio classes in the audio label sequence of the target audio data and in the audio label sequence of the source audio data; and a matching degree calculating unit configured to calculate a matching degree between the target audio data and the source audio data by combining the sequence matching score calculated by the sequence comparing unit with the count matching score calculated by the count comparing unit by use of respective weight values.

Search output unit 908 is configured to output source audio data in the audio database having matching degree determined by matching degree determination unit 906 higher than a predetermined matching threshold as a search result.

With the method and system of this invention, audio searching can be performed automatically without manual labeling.

With the method and system of this invention, audio class labeling can be performed based on context patterns in an iterative manner, to provide a more accurate and reasonable audio search result.

With the method and system of this invention, audio searching can be performed based on context patterns and taking audio class similarity into account.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A pattern based audio searching method, comprising:
   labeling a plurality of source audio data based on patterns to obtain audio label sequences of the source audio data by dividing each of the plurality of source audio data to obtain a plurality of segments;
   obtaining, with a processing device, an audio label sequence of target audio data;
   determining matching degree between the target audio data and the source audio data according to a predetermined matching rule based on the audio label sequence of the target audio data and the audio label sequences of the source audio data;
   outputting source audio data having matching degree higher than a predetermined matching threshold as a search result,
   wherein labeling a plurality of source audio data based on patterns further comprises:
   determining an audio class sequence for each of the plurality of source audio data using a clustering algorithm, based on the obtained plurality of segments;
   building a decision tree based on patterns according to the audio class sequences determined for a plurality of the source audio data;
   training a segment labeling model for each of leaf nodes on the decision tree;
   obtaining an audio label sequence for and adjusting segmentation of each of the plurality of source audio data, using the trained segment labeling model; and
   repeating the determining, building, training and obtaining when a predetermined iteration condition is met.

2. The method according to claim 1, wherein dividing each of the plurality of source audio data comprises any one or more of:
   dividing the source audio data by silence detection; and
   dividing the source audio data by an audio window with a predetermined length.

3. The method according to claim 2, wherein determining an audio class sequence for each of the plurality of source audio data using a clustering algorithm based on the obtained plurality of segments comprises:
   building a Gaussian Mixture Model (GMM) using audio features extracted from the obtained plurality of segments; and
   based on the built GMM, determining an audio class sequence for the source audio data using a clustering algorithm according to specific audio features and audio class distances.

4. The method according to claim 1, wherein building a decision tree based on patterns according to the audio class sequences determined for a plurality of the source audio data comprises:
   defining audio classes in the determined audio class sequences as root nodes on the decision tree;
   creating a pattern problem set based on context of each of the audio classes defined as the root nodes in the audio class sequences; and
   based on the created pattern problem set, determining leaf nodes of the decision tree which branch out from the audio classes in the determined audio class sequences.

5. The method according to claim 3, wherein training a segment labeling model for each of leaf nodes on the decision tree comprises:
   training a Hidden Markov Model (HMM) and a duration model for each of the leaf nodes on the decision tree.

6. The method according to claim 5, wherein obtaining an audio label sequence for and adjusting segmentation of each of the plurality of source audio data, using the trained segment labeling model comprises:
   determining audio class distances of the source audio data using the trained segment labeling model;
   performing Viterbi decoding using audio features extracted from the source audio data and the determined audio class distances, based on the trained segment labeling model; and obtaining the audio label sequence of the source audio data and adjusting the segmentation of the source audio data, according to the Viterbi decoding result.

7. The method according to claim 1, wherein dividing each of the plurality of source audio data to obtain a plurality of segments comprises:
   determining whether the source audio data is voice data; and
   dividing, based on the determination, the source audio data to obtain the plurality of segments.

8. The method according to claim 1, wherein the a predetermined iteration condition comprises any one or more of:
   an adjustment amount of source audio data segmentation being not less than a predetermined segmentation difference; and
   an iteration number being less than a predetermined iteration number threshold.

9. The method according to claim 1, wherein obtaining an audio label sequence of target audio data comprises:
   performing Viterbi decoding on the target audio data to obtain the audio label sequence of the target audio data, based on the trained segment labeling model.

10. The method according to claim 1, wherein determining matching degree between the target audio data and the source audio data according to a predetermined matching rule comprises:
    determining audio class distances between audio classes associated with the target audio data and the source audio data;
    calculating a sequence matching score by comparing the audio label sequence of the target audio data to the audio label sequence of the source audio data based on the determined audio class distances;
    calculating a count matching score by counting the audio classes in the audio label sequence of the target audio data and in the audio label sequence of the source audio data; and
    calculating a matching degree between the target audio data and the source audio data by combining the calculated sequence matching score with the count matching score by use of respective weight values.

11. A pattern based audio searching system, comprising:
    a labeling unit, configured to label a plurality of source audio data based on patterns to obtain audio label sequences of the source audio data using a dividing unit, configured to divide each of the plurality of source audio data to obtain a plurality of segments;
    a target obtaining unit, configured to obtain an audio label sequence of target audio data;
    a matching degree determination unit configured to determine matching degree between the target audio data and the source audio data according to a predetermined matching rule based on the audio label sequence of the target audio data obtained by the target obtaining unit and the audio label sequences of the source audio data obtained by the labeling unit; and
    a search output unit, configured to output source audio data having matching degree determined by the matching degree determination unit higher than a predetermined matching threshold as a search result,
    wherein the labeling unit further comprises:
    a clustering unit, configured to determine an audio class sequence for each of the plurality of source audio data using a clustering algorithm, based on the obtained plurality of segments;
    a decision tree building unit, configured to build a decision tree based on patterns according to the audio class sequences determined for a plurality of the source audio data by the clustering unit;
    a model training unit, configured to train a segment labeling model for each of leaf nodes on the decision tree built by the decision tree building unit;
    a segment adjustment unit, configured to obtain an audio label sequence for and adjusting segmentation of each of the plurality of source audio data, using the trained segment labeling model trained by the model training unit; and
    an iteration condition determination unit, configured to determine whether a predetermined iteration condition is met.

12. The system according to claim 11, wherein the dividing unit is configured to divide each of the plurality of source audio data by any one or more of:
    dividing the source audio data by silence detection; and
    dividing the source audio data by an audio window with a predetermined length.

13. The system according to claim 11, wherein the clustering unit comprises:
    a first clustering sub-unit, configured to build a Gaussian Mixture Model (GMM) using audio features extracted from the obtained plurality of segments; and
    a second clustering sub-unit, configured to, based on the GMM built by the first clustering sub-unit, determine an audio class sequence for the source audio data using a clustering algorithm according to specific audio features and audio class distances.

14. The system according to claim 11, wherein the decision tree building unit comprises:
    a first decision tree building sub-unit, configured to define audio classes in the audio class sequences determined by the clustering unit as root nodes on the decision tree;
    a second decision tree building sub-unit, configured to create a pattern problem set based on context of each of the audio classes defined by the first decision tree building sub-unit as the root nodes in the audio class sequences; and
    a third decision tree building sub-unit, configured to, based on the created pattern problem set, determine leaf nodes of the decision tree which branch out from the audio classes in the determined audio class sequences.

15. The system according to claim 13, wherein the model training unit comprises a unit configured to train a Hidden Markov Model (HMM) and a duration model for each of the leaf nodes on the decision tree.

16. The system according to claim 11, wherein the segment adjustment unit comprises:
    a first segment adjustment sub-unit, configured to determine audio class distances of the source audio data using the segment labeling model trained by the model training unit;
    a second segment adjustment sub-unit, configured to perform Viterbi decoding using audio features extracted from the source audio data and the audio class distances determined by the first segment adjustment sub-unit, based on the trained segment labeling model; and
    a third segment adjustment sub-unit, configured to obtain the audio label sequence of the source audio data and adjust the segmentation of the source audio data, according to the Viterbi decoding result obtained by the second segment adjustment sub-unit.

17. The system according to claim 11, wherein the dividing unit comprises:
- a voice recognition unit, configured to determine whether the source audio data is voice data; and
- a dividing execution unit, configured to divide, based on the determination by the voice recognition unit, the source audio data to obtain the plurality of segments.

18. The system according to claim 11, wherein the predetermined iteration condition comprises any one or more of:
- an adjustment amount of source audio data segmentation being not less than a predetermined segmentation difference; and
- an iteration number being less than a predetermined iteration number threshold.

* * * * *